United States Patent

Nakamura

[11] Patent Number: 5,655,410
[45] Date of Patent: Aug. 12, 1997

[54] WORM TYPE REDUCTION GEAR MECHANISM

[76] Inventor: Hitoshi Nakamura, 7-3, Najiochaencho, Nishinomiya, Hyogo, Japan

[21] Appl. No.: 524,157

[22] Filed: Aug. 16, 1995

Related U.S. Application Data

[63] Continuation of Ser. No. 209,730, Mar. 14, 1994, abandoned.

[51] Int. Cl.$^6$ ..................................................... F16H 1/16
[52] U.S. Cl. ................................................ 74/425; 74/458
[58] Field of Search ........................................ 74/425, 458

[56] References Cited

U.S. PATENT DOCUMENTS

| | | | |
|---|---|---|---|
| 3,190,138 | 6/1965 | MacChesney | 74/425 |
| 3,468,179 | 9/1969 | Sedgwick et al. | 74/425 |
| 4,951,519 | 8/1990 | Ohtsuka | 74/425 |
| 5,090,266 | 2/1992 | Otsuka | 74/425 |
| 5,373,753 | 12/1994 | Toyomasa | 74/425 X |

FOREIGN PATENT DOCUMENTS

| | | | |
|---|---|---|---|
| 61-180046 | 8/1986 | Japan | 74/425 |
| 62-93539 | 4/1987 | Japan | 74/425 |
| 63-158340 | 7/1988 | Japan | 74/425 |

*Primary Examiner*—Allan D. Herrmann
*Attorney, Agent, or Firm*—Armstrong, Westerman, Hattori, McLeland & Naughton

[57] ABSTRACT

A worm type reduction gear mechanism includes a worm, a multiplicity of balls, a ball receiving outer cylinder, a body casing and a worm wheel. A worm shaft is formed with at least one helical ball race and therein with a ball circulation passage extending therethrough and communicating with the ball race to form a circulation circuit. The balls are arrayed in the ball race and the ball circulation passage of the worm shaft and are allowed to run therein and circulate therethrough. The ball receiving outer cylinder is formed with meshing holes and fits the worm rotatably so that the balls may contact with the inner face of the ball receiving outer cylinder. The worm wheel is rotatably supported in the body casing and formed in its circumference with ball meshing teeth which are cut at the pitch or lead interval of the ball race. The balls of the worm are arranged so as to mesh with the ball meshing teeth of the worm wheel in the meshing holes of the ball receiving outer cylinder thereby to transmit the power. As the worm rotates, the balls move endlessly, while being in rolling contact with the inner face of the ball receiving outer cylinder, along the ball race and the ball circulation passage so that they efficiently transmit the rotational force to the worm wheel by the rolling contact with the ball meshing teeth of the worm wheel.

1 Claim, 2 Drawing Sheets

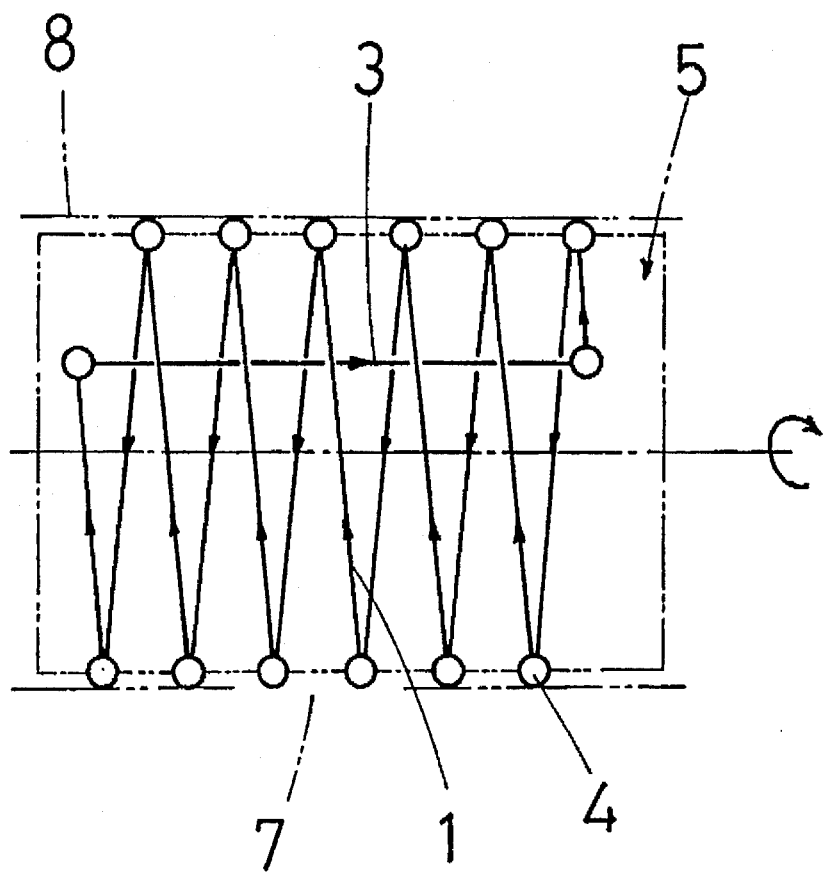

WORM TYPE REDUCTION GEAR MECHANISM

This application is a continuation of application Ser. No. 08/209,730 filed Mar. 14, 1994, now abandoned.

BACKGROUND OF THE INVENTION

1. Field of the Invention

The present invention relates to a worm type reduction gear mechanism which is improved over a worm reduction gear mechanism to be used in case a high reduction gear ratio is required for all industrial fields.

2. Description of the Related Art

The worm reduction gear mechanism widely used and well known in the art is a rotation transmitting means which has two staggered shafts. In this mechanism, one gear consists of a worm having one to four threads (or teeth), and the other gear consists of a worm wheel which has a number of teeth meshing with the teeth of the worm.

This worm reduction gear mechanism is advantageous in that a relatively high reduction ratio can be achieved at a low cost and in a small size. The contacting portions of the worm and the worm wheel frictionally interact so that the transmission efficiency is lower than those of the remaining reduction gear mechanisms. A high reduction ratio produces many problems, such that the back-lash is so high as to severely reduce the transmission efficiency, and that the worm wheel has to be made of an expensive non-ferrous material because to reduce wear or the likelihood of seizure.

SUMMARY OF THE INVENTION

An object of the present invention is to provide a worm type reduction gear mechanism which has high durability, a stable accuracy, less frictional resistance and noise and an excellent economy and to retain high transmission efficiency and reduction ratio by establishing a rolling contact between the worm and the worm wheel.

According to an aspect of the present invention, there is provided a worm type reduction gear mechanism comprising: a worm having its worm shaft fixed to an input shaft by an axial key and rotatably borne at its two end portions by bearings, said worm shaft being formed in its circumference with at least one helical ball race and therein with a ball circulation passage extending therethrough and communicating with said ball race to form a circulation circuit; a multiplicity of balls arrayed in the ball race and the ball circulation passage of said worm shaft and allowed to run therein and circulate therethrough; a ball receiving outer cylinder formed with meshing holes, said worm being so rotatably fitted in said ball receiving outer cylinder that said balls may contact with the inner face of said ball receiving outer cylinder; a body casing fixing said ball receiving outer cylinder irrotationally therein; and a worm wheel rotatably supported in said body casing and formed in its circumference with ball meshing teeth which are cut at the pitch or lead interval of said ball race, the balls of said worm being so arranged as to mesh with the ball meshing teeth of said worm wheel in the meshing holes of said ball receiving outer cylinder thereby to transmit the power.

As the worm rotates, according to the present invention, the balls endlessly move, while being in rolling contact with the inner face of the ball receiving outer cylinder, along the ball race and the ball circulation passage so that they transmit the rotational force highly efficiently to the worm wheel by the rolling contact with the ball meshing teeth of the worm wheel.

According to worm type reduction gear mechanism of the present invention, therefore, the worm teeth are established by the array of the balls, which mesh while rolling with the worm wheel. As a result, the contacting portions between the worm and the worm wheel are established not by the frictional contact but by the rolling contact so that the transmission efficiency and the durability can be improved. Unlike the gears, the worm wheel has its toothed surfaces not tapped but pushed at all times so that the rotation against a load becomes less uneven with less noises and vibrations. Thanks to the provision of a mechanism for applying a pre-pressure, the back-lash can be reduced to improve the accuracy.

Since wear, calorifications and seizure are all reduced or eliminated, an expensive non-ferrous material such as a bronze casting or an aluminum-bronze casting need not be used unlike the prior art so that the worm type reduction gear mechanism can be provided at a reasonable cost.

BRIEF DESCRIPTION OF THE DRAWINGS

FIG. 2 is a diagram showing the locus of balls rolling in the ball race of a worm.

DESCRIPTION OF THE PREFERRED EMBODIMENT

Figure 1:
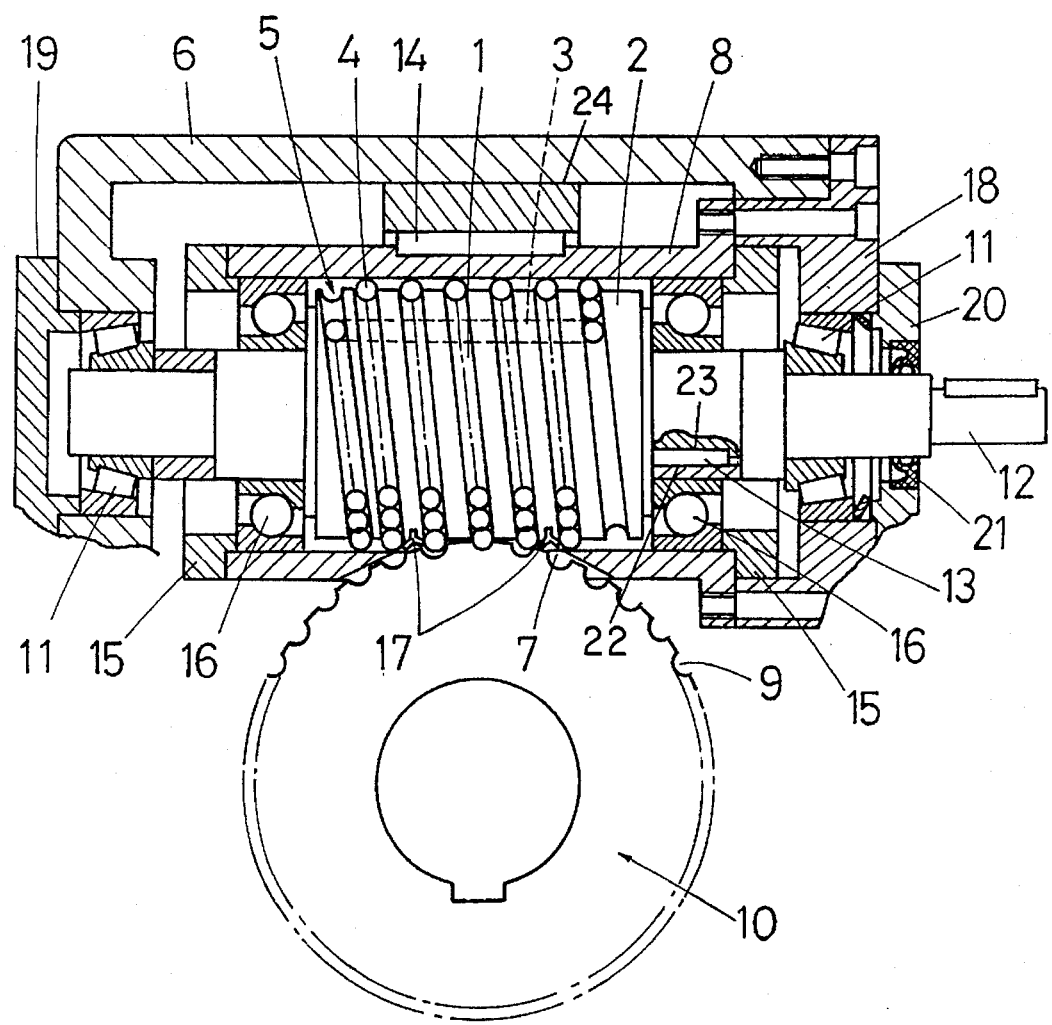
FIG. 1 is a section showing the construction of a worm type reduction gear mechanism according to the present invention with its balls being partially omitted.

A worm type reduction gear mechanism according to the present invention is constructed to comprise a worm 5, a number of balls 4, a ball receiving outer cylinder 8, a body casing 8 and a worm wheel 10. The worm 5 has its worm shaft 2 fixed to an input shaft 12 by an axial key 13 which fits in indentation 22 on the inner periphery of worm shaft 2 and in an indentation 23 on the outer periphery of input shaft 12. The worm 5 is rotatably borne at its two end portions by bearings 11. The worm shaft 2 is formed in its circumference with at least one helical ball race 1 and therein with a ball circulation passage 3 extending therethrough and communicating with the ball race 1 to form a circulation circuit. The balls 4 are arrayed in the ball race 1 and the ball circulation passage 3 of the worm shaft 2 and are allowed to run therein and circulate therethrough. The ball receiving outer cylinder 8 is formed with a meshing hole 7 and fits the worm 5 so rotatably that the balls 4 may contact with the inner face of the ball receiving outer cylinder 8. The body casing 6 fixes the ball receiving outer cylinder 8 irrotationally therein. The worm wheel 10 is rotatably supported in the body casing 6 and formed in its circumference with ball meshing teeth 9 which are cut at the pitch or lead interval of the ball race 1. The balls 4 of the worm 5 are so arranged as to mesh with the ball meshing teeth 9 of the worm wheel 10 in the meshing hole 7 of the ball receiving outer cylinder 8 thereby to transmit the power.

An embodiment of the present invention will be specifically described in the following with reference to the accompanying drawings.

The aforementioned worm 5 is fitted, with its meshing hole 7 being directed downward, in the ball receiving outer cylinder 8 which is irrotationally fixed in the body casing 6 by a stop key 14 in a key retainer 24 and which is further fixed to the body casing 6 by a sleeve 18. On the other hand, the worm 5 is rotatably borne by support bearings 16 which are held under pressure by bearing holders 15 attached to the two end faces of the ball receiving outer cylinder 8.

The worm wheel 10 is fixed on and supported by a (not-shown) shaft which is staggered at a right angle with respect to the aforementioned input shaft 12.

In the meshing hole 7 of the ball receiving outer cylinder 8 for providing the meshing portions between the worm 5 and the worm wheel 10, moreover, there are disposed retainers 17, if necessary, for preventing the balls 4 from dropping.

Reference numeral 19 designates a bearing holder hole cover; numeral 20 a bearing holder cover; and numeral 21 an oil seal for sealing the worm 5 and so on.

In the worm type reduction gear mechanism thus constructed according to the present invention, as the worm 5 rotates, the balls 4 are caused to roll in contact with the inner face of the ball receiving outer cylinder 8 corresponding to the outer cylinder of the bearings by the helical ball race 1 and the outer cylinder 8. As a result, the balls 4 endlessly roll along the ball race 1 and the ball circulation passage 3. During this rolling procedure, moreover, the balls 4 applies the rotational force to the worm wheel 10.

The description thus far made is directed to the one embodiment of the present invention, in which the helical ball race 1 has only one thread. However, the present invention can be modified in various manners without departing from the gist thereof.

For example, the helical ball race 1 may be formed to have two, three or fourth threads, each of which can also be made to communicate with the ball circulation passage 3 in the endless manner.

Moreover, the foregoing embodiment is directed to the case in which the worm 5 is fixed by the axial key 13 to the input shaft 12 rotatably borne at its two end portions by the bearings 11. The present invention may be modified such that the worm shaft 2 and the input shaft 12 are made integral with each other.

In case the ball race is formed by using a hourglass worm as the worm 5, although not shown, the ball meshing teeth of the worm wheel are cut at the pitch or lead interval, as take along the rotation of the hourglass worm, because the center portion and the two end portions have different diameters. Because the meshing portions are increased the more than the cylindrical worm, however, the higher power can be advantageously transmitted without any retainer.

What is claimed is:

1. A worm type reduction gear mechanism comprising:

a worm having its worm shaft fixed to an input shaft by an axial key and rotatably borne at its two end portions by bearings, said worm shaft being formed in its circumference with at least one helical ball race and therein with a ball circulation passage extending therethrough and communicating with said ball race to form a circulation circuit;

a multiplicity of balls arrayed in the ball race and the ball circulation passage of said worm shaft and allowed to run therein and circulate therethrough;

a ball receiving outer cylinder formed with a meshing hole, said worm being so rotatably fitted in said ball receiving outer cylinder that said balls may contact with the inner face of said ball receiving outer cylinder;

a body casing fixing said ball receiving outer cylinder irrotationally therein; and a worm wheel rotatably supported in said body casing and formed in its circumference with ball meshing teeth which are cut at the pitch or lead interval of said ball race, the balls of said worm being so arranged as to mesh with the ball meshing teeth of said worn wheel in the meshing holes of said ball receiving outer cylinder thereby to transmit the power.

* * * * *